United States Patent [19]
Bradford

[11] 3,807,169
[45] Apr. 30, 1974

[54] INTEGRAL PRECOMBUSTOR/RAMBURNER ASSEMBLY

[75] Inventor: James N. Bradford, San Jose, Calif.

[73] Assignee: The United States of America as represented by the Secretary of the United States Air Force, Washinton, D.C.

[22] Filed: June 13, 1973

[21] Appl. No.: 369,655

[52] U.S. Cl.................... 60/261, 60/270, 60/39.47
[51] Int. Cl............................ F02k 3/10, F02k 7/10
[58] Field of Search .......... 60/270, 251, 39.65, 261, 60/39.82 P, 39.47

[56] References Cited
UNITED STATES PATENTS

| | | | |
|---|---|---|---|
| 2,926,613 | 3/1960 | Fox | 60/39.47 |
| 3,635,030 | 1/1972 | Schubert et al | 60/39.47 |
| 3,002,351 | 10/1961 | Sloan | 60/39.82 P |

Primary Examiner—Carlton R. Croyle
Assistant Examiner—O. T. Sessions
Attorney, Agent, or Firm—Harry A. Herbert, Jr.; Arsen Tashjian

[57] ABSTRACT

An air augmented rocket propulsion system wherein a ramburner assembly is positioned at the outlet end of a hybrid rocket gas generator. The ramburner assembly includes a bifurcated air inlet for diverting a specific portion of the ram air to a precombustor for reaction with particulate carbon admixed with the gases leaving the gas generator to produce a high temperature environment hot enough to burn the particulate carbon. The resulting heated mixture including the remaining combustibles then passes into a secondary mixing chamber where it combines with the remainder of the air from the bifurcated air inlet to be burned and momentum exchange between the gases occurs prior to exiting out the ramburner nozzle.

3 Claims, 2 Drawing Figures

PATENTED APR 30 1974    3,807,169

INTEGRAL PRECOMBUSTOR/RAMBURNER ASSEMBLY

BACKGROUND OF THE INVENTION

This invention relates to an air augmented hybrid rocket motor and, more particularly, the invention is concerned with providing an integral precombustor/ramburner assembly wherein fuel-rich gases from the gas generator are directed into a separate precombustor chamber where a portion of the air from a bifurcated air inlet combines with the gases to elevate the temperature and burn the particulate carbon in the chamber and the remainder of the air from the bifurcated air inlet mixes with heated gases from the precombustor in a secondary mixing chamber to be burned prior to exit from the ramburner nozzle.

Heretofore, the standard system for air augmenting hybrid rocket motors having short length ramburners was to combine the fuel-rich constituents of the rocket gas generator with air in a secondary chamber. The fuel-rich gases are then burned with the air to complete the reaction.

In hybrid gas generator propellants which are primarily hydrocarbon in nature, that is, non-metallized, a large amount of free particulate carbon is produced in the gas generator combustion process. This particulate carbon must be burned in the ramburner assembly in order to obtain complete and efficient fuel combustion. However, in the presently known air augmented hybrid rocket motors described above, the addition of air operates to quench the combustion of carbon because of dilution and reduction in temperature thereby allowing the unburned particulate carbon to exit the ramburner assembly. Thus, it would be especially advantageous to provide an area in the ramburner assembly where the particulate carbon can be burned prior to exiting the nozzle and controlling the flow of air into the ramburner assembly by providing a bifurcated inlet so that only a portion of the air reaches the particulate carbon.

SUMMARY OF THE INVENTION

The present invention is concerned with providing an integral precombustor/ramburner assembly wherein the fuel-rich gases from the gas generator are directed into a separate mixing/combustion chamber called a precombustor. A bifurcated air inlet is designed such that an exact amount of air is diverted into the precombustor. This air then combines with the gases such as hydrogen, carbon monoxide, methane, etc. from the gas generator and the resulting reaction produces a temperature environment hot enough to burn the particulate carbon. The resulting mixture is then mixed with the remaining air in the secondary mixing chamber where the remainder of the combustibles are burned and momentum exchange between the gases occurs prior to exiting out the ramburner nozzle.

Accordingly, it is an object of the present invention to provide an improved air augmented hybrid rocket motor wherein an integral precombustor/ramburner assembly includes a bifurcated air inlet for delivering the proper air flow to the precombustor.

Another object of the invention is to provide an improved air augmented hybrid rocket motor which includes a separate burner for particulate carbon combustion integral with the ramburner assembly.

Still another object of the invention is to provide a ramburner assembly for use with a hybrid rocket motor wherein the fuel-rich gases from the gas generator are directed into a separate precombustor section where the particulate carbon is burned in the heated environment produced by air from the bifurcated air inlet.

A further object of the invention is to provide an air augmenting hybrid rocket motor having an integral precombustion/ramburner assembly wherein the burning mixture from the precombustor section passes into a secondary mixing chamber where it is mixed with the remaining air from the bifurcated air inlet causing the remaining combustibles in the mixture to be burned.

These and other objects, features, and advantages will become more apparent after considering the following description taken in conjunction with the annexed drawings and appended claims.

DESCRIPTION OF A PREFERRED EMBODIMENT

Figure 1:
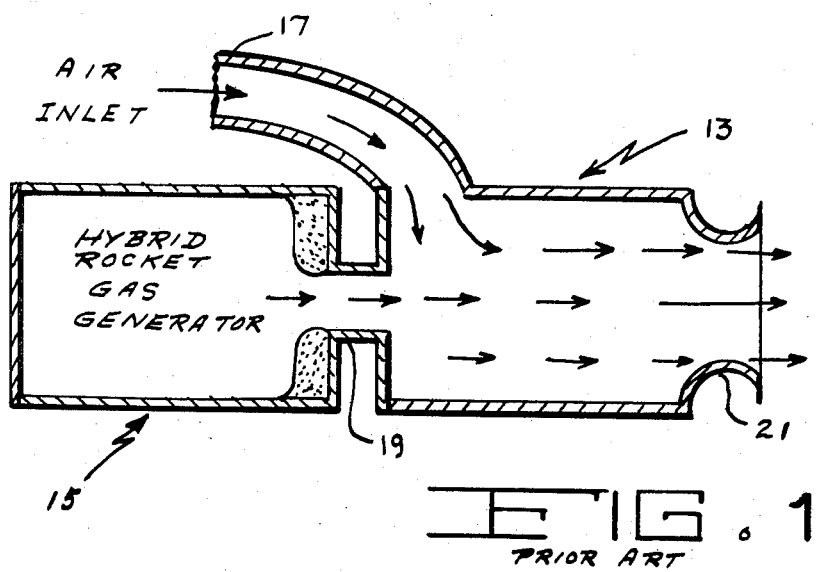
FIG. 1 is an idealized view in cross-section of a prior art air augmented hybrid rocket motor with a short length ramburner showing the standard presently known air inlet.

Referring now to the drawings, in FIG. 1 there is shown a conventional prior art system of air augmenting hybrid rocket motors. A short length ramburner 13 is attached to the downstream end of the gas generator 15. An air inlet 17 serves to introduce outside air to the forward section of the ramburner 13. Gases and free particulate carbon from the gas generator 15 enters the ramburner 13 through the passageway 19. Air from the air inlet 17 combines with these gases and particulate carbon in the ramburner 13 causing some additional burning prior to exiting the nozzle 21.

Since the propellants in hybrid rocket gas generators are mainly hydrocarbon in nature, a large amount of free particulate carbon produced in the combustion process passes through the passageway 19 into the ramburner 13. In order to obtain maximum efficiency of operation of the rocket motor, the free particulate carbon from the gas generator 15 must be burned in the ramburner 13. However, in the assembly shown in FIG. 1, the addition of air from the air inlet 17 directly into the ramburner 13 quenches the combustion of carbon due to dilution and a reduction in temperature.

Figure 2:
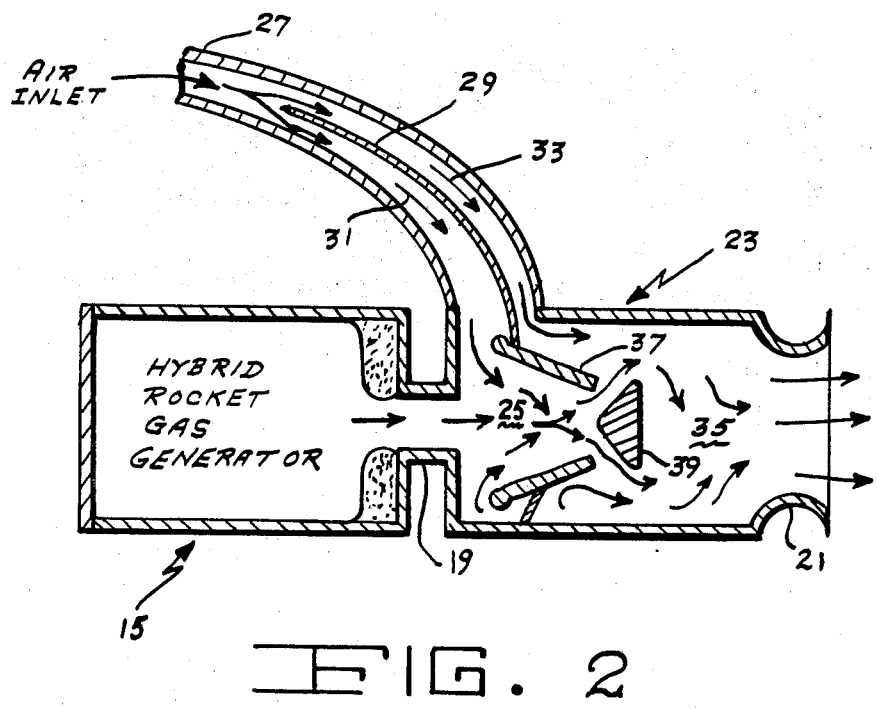
FIG. 2 is an idealized view in cross section of an air augmented hybrid rocket motor according to the invention showing the bifurcated air inlet and including separate precombustor and secondary mixing chambers.

The improved air augmented hybrid rocket motor according to the invention is shown in FIG. 2 and includes a conventional hybrid rocket gas generator 15 having a passageway 19 from which the fuel rich gases pass into the integral precombustor/ramburner assembly 23. The assembly 23 includes a separate mixing/combustion chamber or precombustor 25 immediately downstream from the passageway 19 for receiving the fuel-rich gases. A bifurcated air inlet 27 having a baffle 29 operates to divide the inlet air into two separate streams 31 and 33, stream 31 entering the precombustor 25 and stream 33 entering a secondary mixing chamber 35.

The precombustor 25 is formed by a frustoconical wall 37 which produces a chamber where the fuel-rich gases and particulate carbon from the gas generator 15 are collected and mixed with the air stream 31. This produces a reaction which raises the temperature to thereby create an environment sufficiently hot to burn the particulate carbon. The mixture then passes into the secondary mixing chamber 35 where it mixes with the air stream 33. A deflector 39 is positioned at the downstream end of the combustor 25 so that the heated mixture passing into the secondary mixing chamber 35 is required to follow an irregular path thereby producing a turbulence condition. The air stream 33 which comprises the remaining portion of the ambient air entering the air inlet 27 then combines with the remainder of the combustibles which are in the secondary mixing chamber 35 causing them to burn and momentum exchange between the gases occurs prior to exiting out the ramburner nozzle 21.

It is thus seen that a very efficient and simple means is provided for burning the fuel-rich combustion products from the gas generator section of the rocket motor. The use of the bifurcated air inlet with separate air streams entering separate section of the ramburner produces a highly efficient system for burning the particulate carbon which is present in the combustible gases such as hydrogen, carbon monoxide and methane that leave the gas generator. Also, the other air from the bifurcated inlet mixes with the remainder of the combustibles in the secondary mixing chamber to burn and complete the reaction.

Although the invention has been illustrated in the accompanying drawings and described in the foregoing specification in terms of a preferred embodiment thereof, the invention is not limited to this embodiment or to the preferred configuration mentioned. It will be apparent to those skilled in the art that my invention could have extensive use in other operations where it is desirable to provide a system for improving the efficiency of rocket motors especially where there is presence of particulate carbon in the gases leaving the gas generator.

Having thus set forth the nature of my invention, what I claim and desire to secure by Letters Patent of the United States is:

1. An air augmented hybrid rocket motor comprising, in combination, a hybrid rocket gas generator and an improved ramburner assembly including a precombustor chamber immediately downstream said gas generator and operatively connected therewith to receive fuel rich gases therefrom, a secondary mixing chamber immediately downstream said precombustor for receiving combustible gases therefrom, and a bifurcated inlet for supplying separate controlled portions of ambient air to each of said chambers such that certain of the contents of the precombustor chamber are mixed with the ambient air and burned by heating to elevated temperature while the remainder of the fuel rich gases pass from the precombustor into said secondary mixing chamber for reaction with the remainder of the ambient air from said bifurcated air inlet prior to exiting out the nozzle of the rocket motor.

2. The air augmented hybrid rocket motor defined in claim 1 wherein said precombustor chamber includes a frusto-conical wall portion for providing an area in which the controlled portion of air from said bifurcated air inlet is mixed with fuel rich gases and particulate carbon from the hybrid rocket gas generator.

3. The air augmented hybrid rocket motor defined in claim 2 wherein a deflector is positioned in the secondary mixing chamber at the outlet of said frusto-conical precombustor chamber for deflecting the combustible gases during passage between the two chambers so that the remaining ambient air from said bifurcated air inlet can be properly mixed therewith.

* * * * *